(12) United States Patent  (10) Patent No.: US 7,859,419 B2
Shen-Kuen et al.  (45) Date of Patent: Dec. 28, 2010

(54) SMOKE DETECTING METHOD AND DEVICE (75) Inventors: Chang Shen-Kuen, Chiayi (TW); Lu Chung-Hsien, Jhubei (TW); Chao Hao-Ting, Dadu Township, Taichung County (TW); Chang Shih-Hua, Sinfong Twonship, Hsinchu County (TW); Hsu Yu-Ren, Daliao Township, Kaohsiung County (TW); Huang Kun-Lin, Hsinchu (TW); Wang Cheng-Wei, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 321 days.

(21) Appl. No.: 12/081,014

(22) Filed: Apr. 9, 2008

(65) Prior Publication Data

US 2008/0186191 A1  Aug. 7, 2008

Related U.S. Application Data (63) Continuation-in-part of application No. 11/760,657, filed on Jun. 8, 2007.

(30) Foreign Application Priority Data

Dec. 12, 2006 (TW) .............................. 95146544 A
Dec. 11, 2007 (TW) .............................. 96147299 A (51) Int. Cl.
    *G08B 17/10*  (2006.01)
(52) U.S. Cl. ................. 340/628; 340/575; 340/577; 340/578; 340/584; 340/600; 348/135; 348/169; 348/226.1; 382/100; 382/103; 382/107; 382/190
(58) Field of Classification Search ................. 340/628, 340/575, 577, 578, 584, 600; 382/100, 103, 382/107, 190; 348/135, 169, 226.1
See application file for complete search history.

(56) References Cited

U.S. PATENT DOCUMENTS 5,289,275 A * 2/1994 Ishii et al. .................. 348/154

(Continued)

FOREIGN PATENT DOCUMENTS

CN  1331823 A  1/2002

(Continued)

OTHER PUBLICATIONS

A Fast Accumulative Motion Orientation Model Based on Integral Image for Video Smoke Detection; Yuan et al.; Pattern Recognition Letters, Elsevier, Amsterdam, NL, vol. 29, No. 7, Jan. 29, 2008, pp. 925-932, XP022549886 ISSN: 0167-8655.

(Continued)

*Primary Examiner*—Tai T Nguyen
(74) *Attorney, Agent, or Firm*—Birch, Stewart, Kolasch & Birch, LLP (57) ABSTRACT A smoke detecting method and device are provided. The smoke detecting method and device capture a plurality of images; determine one of the plurality of images as an analyzable image when the one of the plurality of images is identified to have a moving object; analyze a chrominance variation of the analyzable image; analyze at least one of an edge blur and a flickering frequency of the analyzable image; compare at least one of analyzed results from the analyzing steps with a corresponding predetermined feature; and determine the moving object is a smoke when at least one of the analyzed results conforms to the corresponding predetermined feature.

40 Claims, 4 Drawing Sheets

U.S. PATENT DOCUMENTS

| | | | |
|---|---|---|---|
| 5,926,280 A * | 7/1999 | Yamagishi et al. | 356/390 |
| 6,184,792 B1 * | 2/2001 | Privalov et al. | 340/578 |
| 6,956,485 B1 | 10/2005 | Aird et al. | |
| 7,002,478 B2 * | 2/2006 | Moore et al. | 340/577 |
| 7,286,704 B2 * | 10/2007 | Pfefferseder et al. | 382/181 |
| 2002/0024446 A1 | 2/2002 | Grech-Cini | |
| 2006/0115154 A1 | 6/2006 | Chen | |

FOREIGN PATENT DOCUMENTS

| | | |
|---|---|---|
| CN | 1719481 A | 1/2006 |
| EP | 1 220 178 A1 | 7/2002 |
| JP | 64-86687 A | 3/1989 |
| WO | WO 00/23959 A1 | 4/2000 |
| WO | WO 02/054364 A2 | 7/2002 |

OTHER PUBLICATIONS

A Fire-Alarming Method Based on Video Processing; Ping-He Huang et al.; Intelligent Information Hiding and Multimedia Signal Processing, 2006. IIH-MSP '06. Int'l Conference on, IEEE, PI, Dec. 1, 2006; pp. 359-364, XP031034071 ISBN: 978-0/7695-2745-1; p. 359; p. 360; p. 361.

An Image Processing Technique for Fire Detection in Video Images; Marbach G. et al.; Fire Safety Journal, Elsevier Lnkd-Doi: 10. 1016/J. Firesaf. 2006.02.001, vol. 41, No. 4 Jun. 1, 2006, pp. 285-289, XP025086694 ISSN: 0379-7112 [retrieved on Jun. 1, 2006].

Stereo Passive Remote Sensing of Aerosol Transport and Diffusion; Bleiweiss M. P. et al.; Geoscience and Remote Sensing symposium, 1994. Igarss '94. Surface and Atmospheric Remote Sensing: Technologies, Data Analysis and Interpretation; vol. 4, Aug. 8, 1994; pp. 1907-1910.

Wavelet Based Real-Time Smoke Detection in Video; B. Ugur Toreyin et al., 13th European Signal Processing Conference Eusipco; Sep. 2005, XP002577569 Antalya Retrieved from the Internet: URL: http://www.cs.bilkent.edu.tr/{yigithan/publications/eusipco2005.pdf> [retrieved on Apr. 9, 2010].

* cited by examiner

SMOKE DETECTING METHOD AND DEVICE

CROSS-REFERENCE TO RELATED APPLICATIONS

This application is a Continuation-In-Part of co-pending application Ser. No. 11/760,657 filed on Jun. 8, 2007, and for which priority is claimed under 35 U.S.C. §120; and this application claims priority of Application No. 95146544 filed in Taiwan on Dec. 12, 2006 under 35 U.S.C. §119; the entire contents of all are hereby incorporated by reference.

FIELD OF THE INVENTION

The present invention relates to a smoke detecting method and device, and more particular, to a smoke detecting method and device using the image analysis methods.

BACKGROUND OF THE INVENTION

In most fires, the smoke is usually generated first, followed by the occurrence of flames. In some fires, burning of some substances generates the smoke only. Therefore, the smoke detection is a very important object for fire prevention and rescue. When using a smoke detecting system, a fire can be reported at its early stage so that the early fire fighting may be proceeded to reduce the casualties.

The conventional smoke detecting devices, such as a photoelectric smoke detector and an air sampling smoke detector, use the physical properties resulting from increase of the smoke particles as the basis of fire detection. The photoelectric smoke detector emits the light. The light is scattered and the brightness is changed when smoke particles exist in the air. Because the photoelectric smoke detector detects the variation of the brightness by light emitting to determine if there is a fire, the detecting range thereof is restricted. Therefore, the smoke detecting in large areas by the photoelectric smoke detector may not be effective. The air sampling smoke detector collects the air sample in the detecting area and analyzes the elements of the collected air to determine if there is a fire. To collect the air sample, the air sampling smoke detector must be equipped with a duct system for facilitating the detection. Besides, the sensors of the air sampling smoke detector are very expensive.

Accordingly, the conventional smoke detecting devices have the shortcomings as follows: 1) it is hard to detect a smoke in high and large-area buildings, such as the factories, the stadiums and the shopping malls, thereby wasting the early rescuing time; 2) the accuracy thereof is too low, thereby causing too many false alarms; and 3) a large number of sensors, ducts and controlling systems needs to be installed, thereby raising the cost.

Therefore, for improving the accuracy of the smoke detecting device and reducing the cost, the visual smoke detecting device has been recently developed, which identifies if there is any object whose features meet the fire smoke by using the original monitoring system in a building. Once the smoke detecting device determines the object as the fire smoke, an alarm will be generated. U.S. Pat. No. 6,184,792 discloses a method and apparatus for detecting early fire in a monitored area, which analyzes a brightness variation of video images by performing a Fast Fourier Transform (FFT) on the temporally varying pixel intensities, and U.S. Pat. No. 6,956,485 discloses a fire detection algorithm to analyze a frequency variation by a filter-analyzing technology. However, the accuracy of these detecting methods is not mentioned in theses patents, and other analyzing techniques, e.g. a chrominance variation analysis, are not applied in these patents.

SUMMARY OF THE INVENTION

In order to overcome the drawbacks in the prior art, a novel smoke detecting method and device are provided. Not only does the present invention solve the problems described above, but also it achieves high accuracy of the smoke detection. Therefore, the present invention has its utility for the industry.

In accordance with one aspect of the present invention, a smoke detecting method is provided. The smoke detecting method comprises capturing a plurality of images; determining one of the plurality of images as an analyzable image when the one of the plurality of images is identified to have a moving object; analyzing a chrominance variation of the analyzable image; analyzing at least one of an edge blur and a flickering frequency of the analyzable image; comparing at least one of analyzed results from the analyzing steps with a corresponding predetermined feature; and determining the moving object is a smoke when at least one of the analyzed results conforms to the corresponding predetermined feature.

In accordance with another aspect of the present invention, a smoke detecting device is provided. The smoke detecting device comprises an image capturing device capturing a plurality of images; an analyzing device coupled to the image capturing device, determining one of the plurality of images as an analyzable image when the one of the plurality of images is identified to have a moving object, analyzing a chrominance variation of the analyzable image, and analyzing at least one of an edge blur and a flickering frequency of the analyzable image; and a determining device coupled to the analyzing device for comparing at least one of analyzed results obtained from the analyzing device with a corresponding predetermined feature and determining the moving object is a smoke when at least one of the analyzed results conforms to the corresponding predetermined feature.

In accordance with a further aspect of the present invention, a smoke detecting method is provided. The smoke detecting method comprises capturing a plurality of images, the images comprising a background image and an analyzable image having a moving object; analyzing at least one variation of S, U, V and I values of each pixel displaying the moving object in the analyzable image; and determining if the moving object is a smoke by comparing analyzed results from the analyzing step with a corresponding predetermined feature.

In accordance with further another aspect of the present invention, a smoke detecting device is provided. The smoke detecting device comprises an image capturing device capturing a plurality of images, the images comprising a background image and an analyzable image having a moving object; an analyzing device coupled to the image capturing device, and analyzing at least one variation of S, U, V and I values of each pixel displaying the moving object in the analyzable image; a determining device coupled to the analyzing device for determining if the moving object is a smoke by comparing analyzed results obtained from the analyzing device with a corresponding predetermined feature.

In accordance with further another aspect of the present invention, a smoke detecting method is provided. The smoke detecting method comprises capturing a plurality of images, the images comprising a background image and an analyzable image having a moving object; analyzing an edge blur of the analyzable image by detecting an edge pixel(s) in a plurality of pixels displaying the moving object in the analyzable image and analyzing a strength value variation of each of the edge pixel(s); and determining if the moving object is a smoke by comparing analyzed results from the analyzing step with a corresponding predetermined feature.

In accordance with further another aspect of the present invention, a smoke detecting device is provided. The smoke detecting device comprises an image capturing device capturing a plurality of images, the images comprising a background image and an analyzable image having a moving object; an analyzing device coupled to the image capturing device, detecting an edge pixel(s) in a plurality of pixels displaying the moving object in the analyzable image, and analyzing a strength value variation of each of the edge pixel(s); and a determining device coupled to the analyzing device for determining if the moving object is a smoke by comparing analyzed results obtained from the analyzing device with a corresponding predetermined feature.

In accordance with further another aspect of the present invention, a smoke detecting method is provided. The smoke detecting method comprises capturing a plurality of images, the images comprising an analyzable image having a moving object; analyzing a centroid of the moving object and if the moving object is expanding within a predetermined time period; and determining if the moving object is a smoke by comparing analyzed results from the analyzing step with a corresponding predetermined feature.

In accordance with further another aspect of the present invention, a smoke detecting device is provided. The smoke detecting device comprises an image capturing device capturing a plurality of images, the images comprising an analyzable image having a moving object; an analyzing device coupled to the image capturing device, analyzing a centroid of the moving object and if the moving object is expanding within a predetermined time period; and a determining device coupled to the analyzing device for determining if the moving object is a smoke by comparing analyzed results obtained from the analyzing device with a corresponding predetermined feature.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE ILLUSTRATED EMBODIMENTS

The present invention will now be described in detail with reference to the accompanying drawings, wherein the same reference numerals will be used to identify the same or similar elements throughout the several views. It should be noted that the drawings should be viewed in the direction of orientation of the reference numerals.

To overcome the drawbacks of the conventional fire smoke detecting device which causes the false alarms and delays the rescuing action, the present invention provides a novel smoke detecting method and device. In the smoke detecting method and device as illustrated, several analyzing methods and devices are optionally used to analyze a feature of an analyzable image having a moving object, and analyzed results obtained from the respective analyzing devices are compared with a corresponding predetermined feature, which comprises a chrominance variation, an edge blur, a flickering frequency and an action pattern collected from at least one predetermined image having a sample smoke and stored in a database. If the compared result is positive and the moving object is determined as a smoke, the feature of the analyzable image may also be collected into the database for a future use. The thresholds of each predetermined feature are the enormous experimental and statistic calculated data from different images having fire smoke. Therefore, such analyzing and comparing processes can more accurately identify an image having fire smoke.

Figure 1:
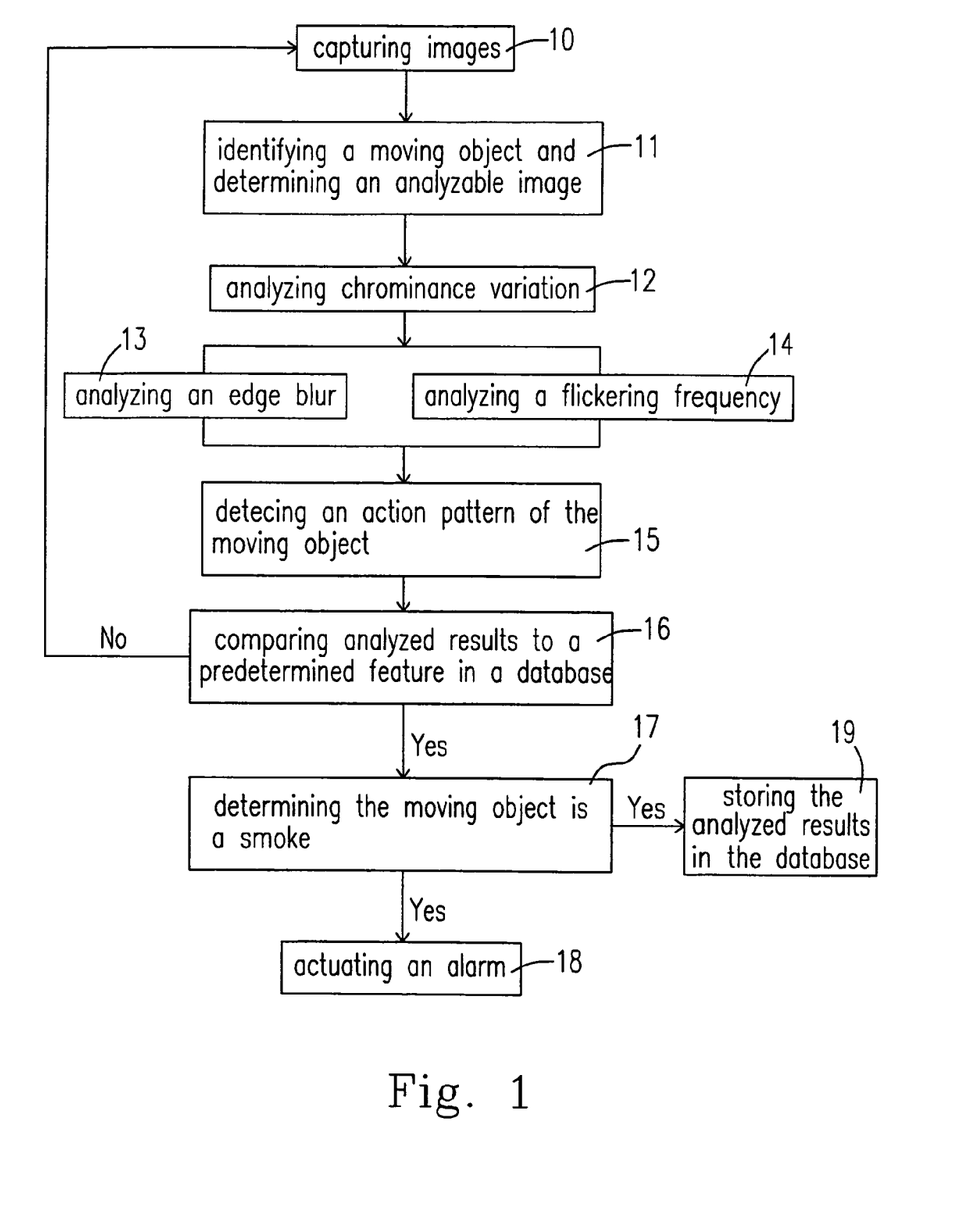
FIG. 1 is a diagram showing a flow chart of a smoke detecting method according to an embodiment in the present invention.

FIG. 1 shows a flow chart of the smoke detecting method according to an embodiment in the present invention. First, a plurality of images are captured by a camera in a monitored area (step 10). Then it is determined whether at least one of the plurality of images having a moving object is identified and the image having the moving object is determined as an analyzable image (step 11). The step 11 may further comprise a step of determining one of the plurality of images as a background image. After the analyzable image is determined in the step 11, a chrominance variation of the analyzable image is analyzed (step 12), an edge blur of the analyzable image is analyzed (step 13), a flickering frequency of the analyzable image is analyzed (step 14), and an action pattern of the moving object is detected (step 15). It should be noted that although FIG. 1 shows that the steps 12-15 are carried out consecutively, the above mentioned steps can also be carried out optionally without a specific sequence. For example, some of the steps 12-15 can be selectively performed or skipped. After obtaining analyzed results from at least one of the steps 12-15, the analyzed results are compared with a predetermined feature in a database (step 16). If at least one of the analyzed results conforms to the predetermined feature, it is determined that the moving object is a smoke (step 17). If the moving object is determined as the smoke, an alarm is actuated (step 18) and/or the analyzed results are stored in the database (step 19).

In the above-mentioned embodiment, the predetermined feature is collected from at lease one predetermined image having a sample smoke, which comprises a chrominance variation, an edge blur, a flickering frequency, an action pattern and so on, and the predetermined feature is stored in the database. Furthermore, the smoke detecting method may further comprise a step of setting a location in the background image as a no-analyzing location before determining one of the plurality of images as the analyzable image in the step 11. The no-analyzing location is a location in the monitored area unlikely a fire occurs therein, such as a pool.

In the illustrated smoke detecting method, the moving object is displayed by a group of pixels in the analyzable image, the background image has a portion displayed by the same group of pixels, and the analyzable image may be compared with the same group of pixels in the background image to obtain the analyzed results in the step 12 and the step 13. The step 12 comprises a step of detecting an S value of each of the group of pixels in the analyzable image, and the analyzed result of the step 12 will be determined to conform to the predetermined feature in the step 16 if the S value of the each pixel is less than 0.2.

Furthermore, the step 12 further comprises the steps of detecting if each of the group of pixels in the analyzable image is a gray-level pixel, and detecting the respective variation in S, Y, U and V values of each of the group of pixels in the analyzable image when compared with the same group of pixels in the background image. When the pixel in the analyzable image is a gray-level pixel, and if the S value of that pixel in the analyzable image is lower than the S value of the same pixel in the background image (i.e., the variation of the S value is negative) and the Y value of that pixel in the analyzable image is higher than the Y value of the same pixel in the background image (i.e., the variation of the Y value is positive), the analyzed result of the step 12 will be determined to conform to the predetermined feature in the step 16. Alternatively, when the pixel is not a gray-level pixel in the analyzable image (i.e., when the pixel is a color pixel), and if the respective absolute value of the U value and V value of that pixel in the analyzable image are lower than the respective absolute value of the U value and V value of the same pixel in the background image (i.e., the variation of the U value and V value is negative) and the Y value of that pixel in the analyzable image is higher than the Y value of the same pixel in the background image (i.e., the variation of the Y value is positive), the analyzed result of the step 12 will also be determined to conform to the predetermined feature in the step 16.

Moreover, the step 12 further comprises the steps of calculating the difference of the I values of each of the group of pixels between the background image and the analyzable image, and defining a first number of pixels, each of which has the difference smaller than a first predetermined value, and the analyzed result of the step 12 will be determined to conform to the predetermined feature in the step 16 if a ratio of the first number to the total number of the group of pixels is larger than a second predetermined value. Preferably, the first predetermined value is 100, and the second predetermined value is 0.7.

In the step 12, the S, Y, U, V and I values are obtained from detecting at least one of the color models RGB, HSI and YUV for each of the group of pixels in the analyzable image and the background image. Generally, the RGB value is detected first, and then is transformed to the HSI and YUV values.

In the illustrated smoke detecting method, the step 13 comprises the steps of detecting a number of edge pixels in the group of pixels, and calculating a first strength value of each of the edge pixels in the analyzable image and a second strength value of each corresponding pixel in the background image via edge detection operators, such as Prewitt, Sobel, and Laplacian operators. Subsequently, if a ratio of the first strength value to the second strength value for a particular edge pixel is less than a predetermined value (preferably in a range of 0.2 to 0.75), that particular edge pixel of the first number of edge pixels is defined as an edge blur pixel. Therefore, the number of the edge blur pixels in the edge pixels is detected. The analyzed result of the step 13 will be determined to conform to the predetermined feature in the step 16 if a ratio of the number of the edge blur pixels to the number of the edge pixels is within a predetermined range. Preferably, the predetermined range is 0.1 to 0.9.

In the illustrated smoke detecting method, the step 14 is to analyze the brightness of the analyzable image varying within a predetermined time period by using a time wavelet calculation, preferably a one-dimensional time wavelet calculation. If the flickering frequency of the analyzable image is in a range of 0.5-5 Hz, the analyzed result of the step 14 will be determined to conform to the predetermined feature in the step 16.

In the illustrated smoke detecting method, the step 15 comprises the steps of detecting a centroid of the moving object and detecting if the moving object is expanding within a predetermined time period, and the analyzed result of the step 15 will be determined to conform to the predetermined feature in the step 16 if the centroid is moving in one of the upward and downward directions within the predetermined time period while the moving object expands within the predetermined time period.

More specifically, when the centroid of the moving object continuously moves upward within a predetermined time period, and an area of the moving object is expanding within the predetermined time period, it is further determined that the fire is a plume-type fire. On the other hand, when the centroid of the moving object continuously moves downward in a specific location (e.g., a ceiling) within a predetermined time period, and an area of the moving object is expanding within the predetermined time period, it is further determined that the fire is an accumulative-type fire.

In an embodiment, the step 14 and the step 15 are carried out when the analyzed results of the step 12 and the step 13 have been already determined to conform to the predetermined feature by the step 16, and the step 17 is carried out when all of the analyzed results obtained from the steps 12-15 have been determined to conform to the predetermined feature by step 16. However, to increase the efficiency and reduce the complexity of the smoke detecting method, the steps 12-15 can be randomly and optionally carried out without a specific sequence.

Figure 2:
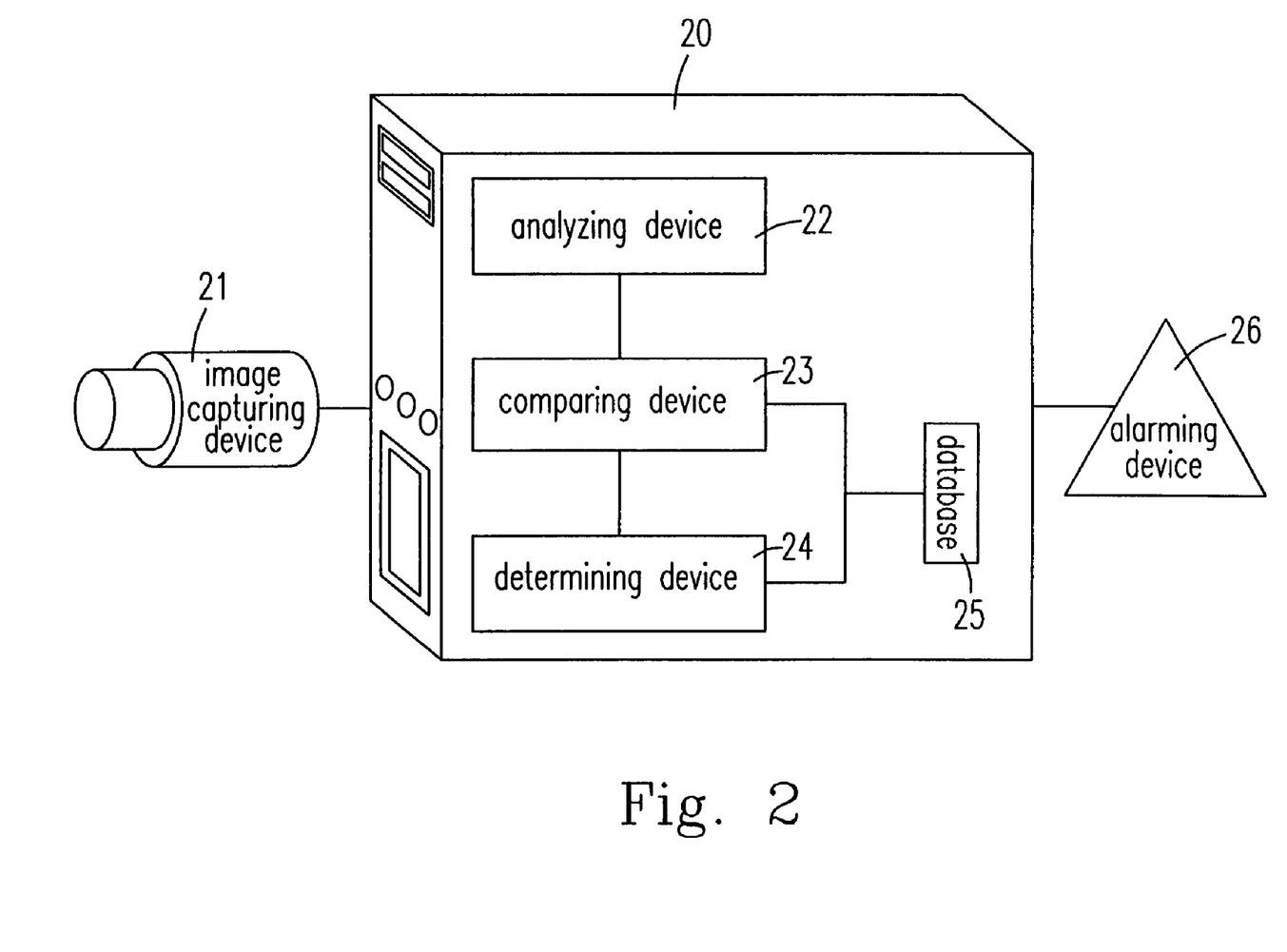
FIG. 2 is a diagram showing a smoke detecting device according to an embodiment of the present invention.

FIG. 2 shows a smoke detecting device according to an embodiment of the present invention. The smoke detecting device comprises an image capturing device 21, an analyzing device 22, a comparing device 23, a determining device 24, a database 25 and an alarming device 26. The image capturing device 21 can be a web camera, a cable camera, etc. for capturing a video segment comprising a plurality of images, wherein at least one of the plurality of images is a background image. The analyzing device 22 can be located in a computer 20 for identifying if at least one of the plurality of images has a moving object, determining the image having the moving object as an analyzable image, analyzing a chrominance variation, an edge blur, and a flickering frequency of the analyzable image, and detecting an action pattern of the moving object. The comparing device 23 is coupled to the analyzing device 22 for comparing analyzed results obtained from the analyzing device 22 with a predetermined feature in the database 25, and the determining device 24 is coupled to the comparing device 23 for determining that the moving object is a smoke if at least one of the analyzed results conforms to the predetermined feature.

The database 25 stores the predetermined feature comprising a chrominance variation, an edge blur, a flickering frequency and an action pattern collected from at lease one predetermined image having a sample smoke. The alarming device 26 coupled to the computer 20 is for actuating an alarm when the moving object is determined as the smoke by the determining device 24. To enhance the accuracy of the determining device 24 in different situations, the user can optionally set which ones of the analyzed results obtained from the analyzing device 22 must conform to the predetermined feature before the alarming device 26 is actuated.

The detailed analyzing methods for analyzing the chrominance variation, the edge blur, the flickering frequency, and the action pattern of the moving object have been described in the above-mentioned embodiments of the smoke detecting method and illustrated in FIG. 1. In addition to the technical features disclosed in the illustrated embodiments, the chrominance variance and the edge blur of an image can also be analyzed by using a two-dimensional space wavelet calculation.

Figure 3:
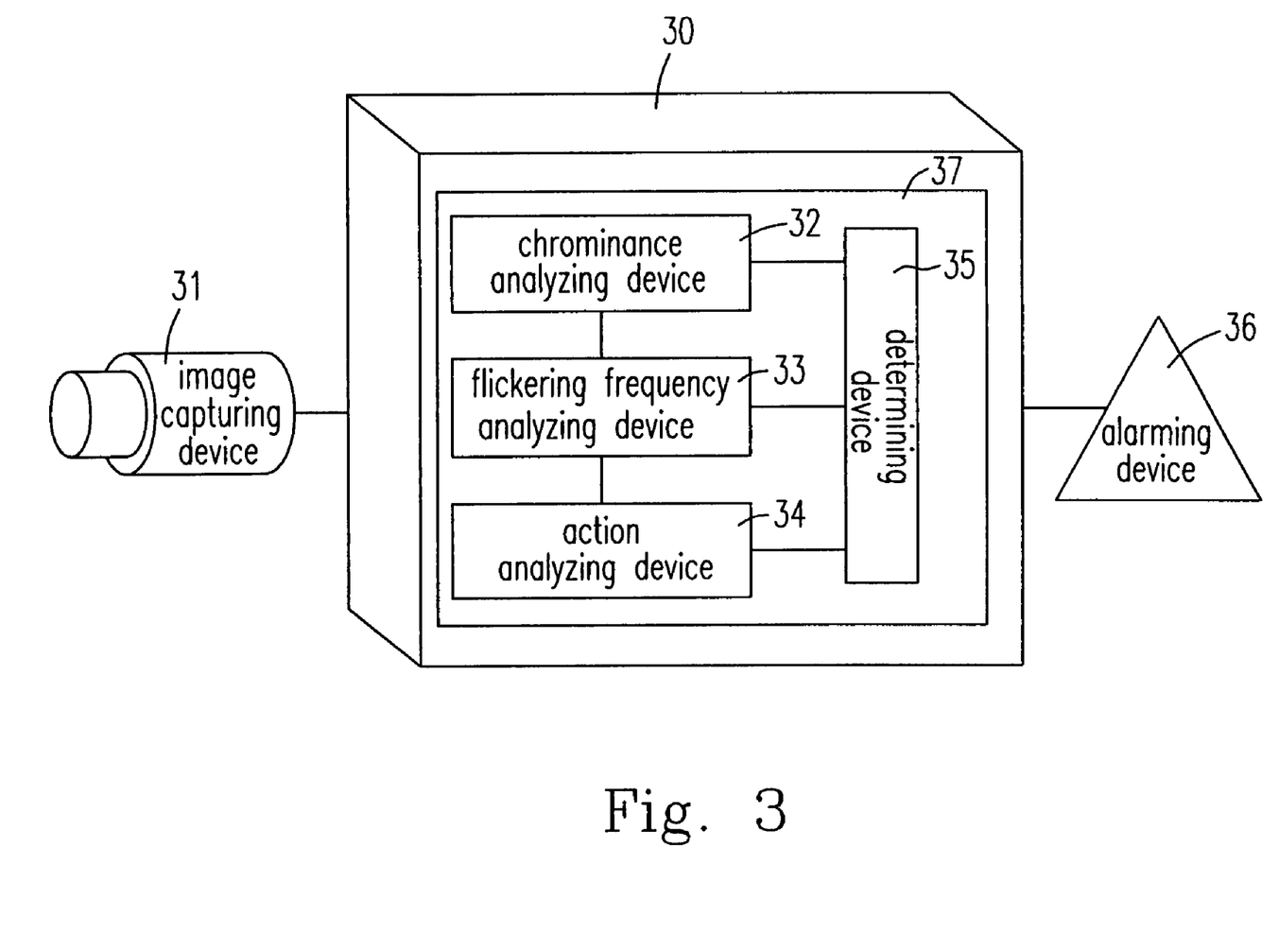
FIG. 3 is a diagram showing a smoke detecting device according to another embodiment of the present invention.

FIG. 3 shows a smoke detecting device according to another embodiment of the present invention. The smoke detecting device comprises a digital video recorder 30, an image capturing device 31, and an alarming device 36. The digital video recorder 30 comprises a digital signal processing chip 37, which contains a chrominance analyzing device 32, a flickering frequency analyzing device 33, an action analyzing device 34 and a determining device 35.

The image capturing device 31 captures a video segment comprising a plurality of images, wherein one of the plurality of images is a background image and another one of the plurality of images is an analyzable image having a moving object. The plurality of images are transmitted and recorded in the digital video recorder 30. The chrominance analyzing device 32 analyzes a chrominance variation of the analyzable image, the flickering frequency analyzing device 33 analyzes a flickering frequency of the analyzable image, and the action analyzing device 34 detects a centroid of the moving object and if the moving object is expanding within a predetermined time period. The determining device 35 compares analyzed results obtained from at least one of the chrominance analyzing device 32, the flickering frequency analyzing device 33 and the action analyzing device 34 with a predetermined feature, and determines that the moving object is a smoke if at least one of the analyzed results conforms to the predetermined feature. In an embodiment, the determining device 35 can be set to determine the moving object is a smoke when all of the analyzed results conform to the predetermined feature.

When the moving object is determined as the smoke by the determining device 35, the alarm device 36 coupled to the digital signal processing chip 37 will send an alarm signal to a central controlling computer of the fire monitoring center, a smoke signal receiver or a cell phone.

Furthermore, an edge blur analyzing device analyzing an edge blur of the analyzable image can be used to replace at least one of the chrominance analyzing device 32, the flickering frequency analyzing device 33 and the action analyzing device 34. For example, the flickering frequency analyzing device 33 may be substituted by the edge blur analyzing device. Of course, the digital video recorder 30 can also further include edge blur analyzing device, in addition to the chrominance analyzing device 32, the flickering frequency analyzing device 33 and the action analyzing device 34.

The technical features of the analyzing methods of the chrominance analyzing device 32, the flickering frequency analyzing device 33, the action analyzing device 34 and the edge blur analyzing device have been described in the above-mentioned embodiments of the smoke detecting method according to the embodiment illustrated in FIG. 1.

Figure 4:
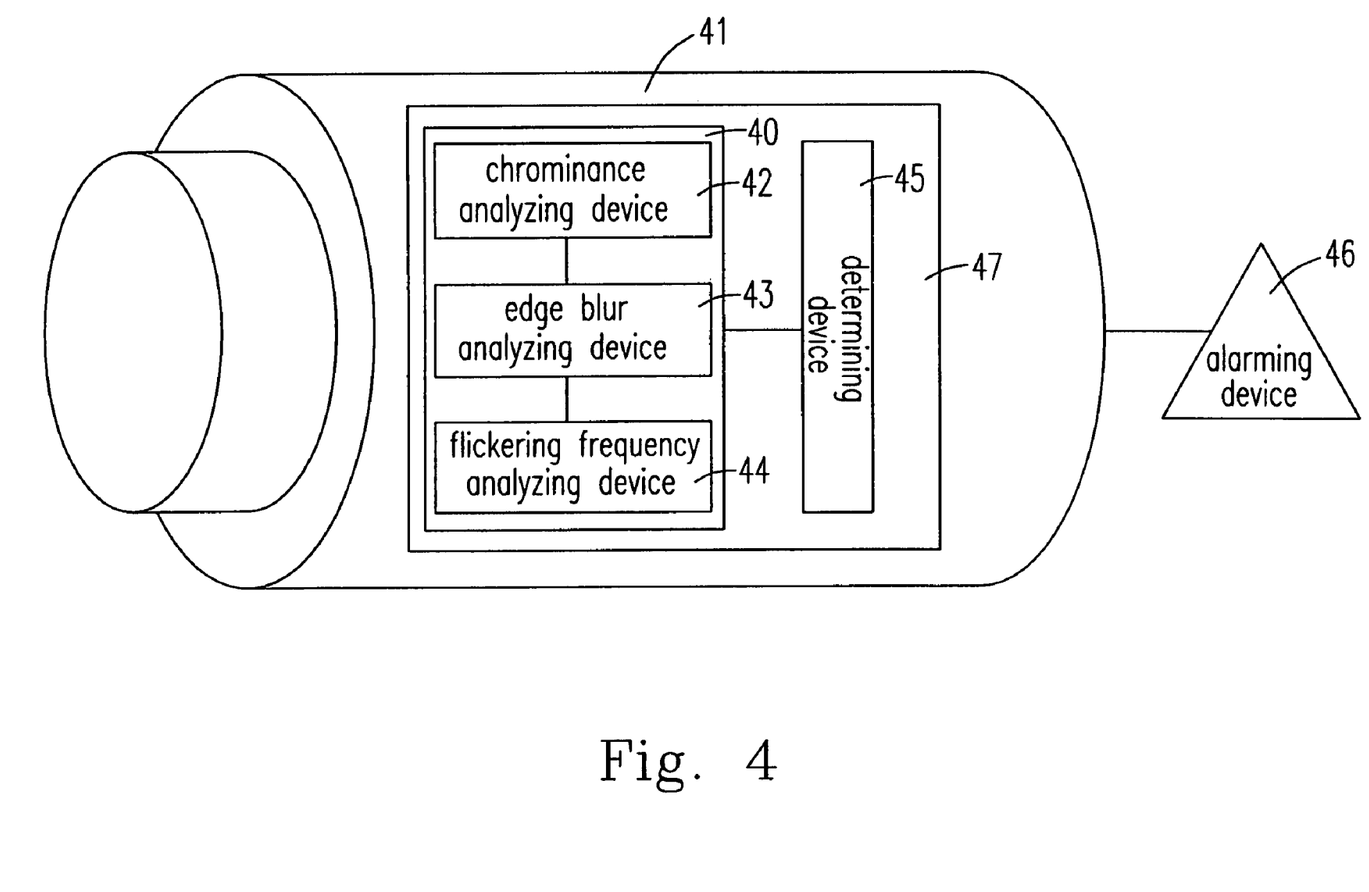
FIG. 4 is a diagram showing a smoke detecting device according to further another embodiment of the present invention.

FIG. 4 shows a smoke detecting device according to another embodiment of the present invention. This smoke detecting device includes an image capturing device 41 and an alarm device 46. The image capturing device 41 comprises a digital signal processor 47, which contains an analyzing device 40 and a determining device 45. The analyzing device 40 comprises a chrominance analyzing device 42 analyzing a chrominance variation of the analyzable image, an edge blur analyzing device 43 analyzing an edge blur of the analyzable image, and a flickering frequency analyzing device 44 analyzing a flickering frequency of the analyzable image. The determining device 45 is coupled to the analyzing device 40 for determining if the moving object is a smoke by comparing analyzed results obtained from the analyzing device 40 with a predetermined feature.

In an embodiment, the analyzing device 40 further comprises an action analyzing device detecting a centroid of the moving object and if the moving object is expanding within a predetermined time period, so as to enhance the accuracy of the determining device 45. When the moving object is determined as the smoke by the determining device 45, the alarm device 46 coupled to the digital signal processor 47 will be actuated.

The database in the illustrated smoke detecting device stores lots of smoke feature data, which are the smoke image analyzed results from a lot of fire documentary films or other sources. The predetermined smoke feature functioning as a threshold is obtained by analyzing and statistically calculating the smoke in the fire documentary films or other sources. Furthermore, the illustrated smoke detecting device may further comprise a setting device setting a location in the background image as a no-analyzing location before one of the plurality of images is determined as an analyzable image.

Accordingly, the illustrated smoke detecting method and device can precisely determine whether a fire smoke exists in an image so as to detect and alarm the fire at the early stage. Therefore, the fire may be put out in its early stage and the disaster and casualties may be prevented. Furthermore, the smoke detecting device may be set in an existing network system or a monitoring device, which achieve a better smoke detecting effect without extra expensive construction or facilities.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A smoke detecting method, comprising:
   capturing a plurality of images;
   determining one of the plurality of images as an analyzable image when the one of the plurality of images is identified to have a moving object;
   analyzing a chrominance variation of the analyzable image;
   analyzing at least one of an edge blur and a flickering frequency of the analyzable image;
   comparing at least one of analyzed results from the analyzing steps with a corresponding predetermined feature; and
   determining the moving object is a smoke when at least one of the analyzed results conforms to the corresponding predetermined feature.

2. The smoke detecting method according to claim 1, further comprising actuating an alarm when the moving object is determined as the smoke.

3. The smoke detecting method according to claim 1, wherein the step of analyzing the chrominance variation of the analyzable image further comprises:
   analyzing at least one variation of S, Y, U, V and I values of each pixel displaying the moving object in the analyzable image.

4. The smoke detecting method according to claim 1, wherein the step of analyzing the edge blur of the analyzable image further comprises:
   detecting an edge pixel(s) in a plurality of pixels displaying the moving object in the analyzable image and analyzing a strength value variation of each of the edge pixel(s).

5. The smoke detecting method according to claim 1, wherein the step of analyzing the flickering frequency of the analyzable image further comprises:
   analyzing the flickering frequency of the analyzable image by a time wavelet calculation.

6. The smoke detecting method according to claim 1 further comprising a step of:
   setting a location in a background image of the plurality of images as a no-analyzing location before the step of determining one of the plurality of images as an analyzable image.

7. The smoke detecting method according to claim 1 further comprising a step of:
   analyzing a centroid of the moving object and if the moving object is expanding within a predetermined time period.

8. A smoke detecting device, comprising:
   an image capturing device capturing a plurality of images;
   an analyzing device coupled to the image capturing device, determining one of the plurality of images as an analyzable image when the one of the plurality of images is identified to have a moving object, analyzing a chrominance variation of the analyzable image, and analyzing at least one of an edge blur and a flickering frequency of the analyzable image; and
   a determining device coupled to the analyzing device for comparing at least one of analyzed results obtained from the analyzing device with a corresponding predetermined feature and determining the moving object is a smoke when at least one of the analyzed results conforms to the corresponding predetermined feature.

9. The smoke detecting device according to claim 8 further comprising an alarming device coupled to the determining device for actuating an alarm when the moving object is determined as the smoke.

10. The smoke detecting device according to claim 8, wherein the analyzing device further comprising a chrominance analyzing device analyzing at least one variation of S, Y, U, V and I values of each pixel displaying the moving object in the analyzable image.

11. The smoke detecting device according to claim 8, wherein the analyzing device further comprising at least one of:
   an edge blur analyzing device detecting an edge pixel(s) in a plurality of pixels displaying the moving object in the analyzable image and calculating a strength value variation of each of the edge pixel(s); and
   a flickering frequency analyzing device analyzing a flickering frequency of the analyzable image by a time wavelet calculation.

12. The smoke detecting device according to claim 8 further comprising:
   a setting device setting a location in a background image of the plurality of images as a no-analyzing location before the analyzing device determining one of the plurality of images as an analyzable image.

13. The smoke detecting device according to claim 8, wherein the analyzing device further comprising:
   an action analyzing device analyzing a centroid of the moving object and if the moving object is expanding within a predetermined time period.

14. The smoke detecting device according to claim 8, wherein the analyzing device is one of a computer and a digital signal processing chip.

15. A smoke detecting method, comprising:
   capturing a plurality of images, the images comprising a background image and an analyzable image having a moving object;
   analyzing at least one variation of S, U, V and I values of each pixel displaying the moving object in the analyzable image; and
   determining if the moving object is a smoke by comparing analyzed results from the analyzing step with a corresponding predetermined feature.

16. The smoke detecting method according to claim 15, further comprising actuating an alarm when the moving object is determined as the smoke.

17. The smoke detecting method according to claim 15, wherein a combination of the analyzing step and the determining step further comprises:
   analyzing an S value of the each pixel displaying the moving object in the analyzable image; and
   determining the analyzed results conform to the corresponding predetermined feature when the S value of the each pixel is less than a predetermined value.

18. The smoke detecting method according to claim 15, wherein the determining step further comprises determining the analyzed results conform to the corresponding predetermined feature when the variations in an absolute value of the U value and an absolute value of the V value are negative when compared with the background image.

19. The smoke detecting method according to claim 15, wherein a combination of the analyzing step and the determining step further comprises:
   calculating a difference of respective I values of the each pixel displaying the moving object between the background image and the analyzable image;
   defining a first number of pixels, each of which has the difference smaller than a first predetermined value; and
   determining the analyzed results conform to the corresponding predetermined feature when a ratio of the first number to a total number of the pixels displaying the moving object is larger than a second predetermined value.

20. The smoke detecting method according to claim 15, wherein the analyzing step further comprises analyzing at least one of an edge blur and a flickering frequency of the analyzable image.

21. The smoke detecting method according to claim 15, wherein the analyzing step further comprises analyzing a centroid of the moving object and if the moving object is expanding within a predetermined time period.

22. A smoke detecting device, comprising:
   an image capturing device capturing a plurality of images, the images comprising a background image and an analyzable image having a moving object;
   an analyzing device coupled to the image capturing device, and analyzing at least one variation of S, U, V and I values of each pixel displaying the moving object in the analyzable image;
   a determining device coupled to the analyzing device for determining if the moving object is a smoke by comparing analyzed results obtained from the analyzing device with a corresponding predetermined feature.

23. The smoke detecting device according to claim 22, wherein the analyzing device further comprises a flickering frequency analyzing device analyzing a flickering frequency of the analyzable image.

24. The smoke detecting device according to claim 22, wherein the analyzing device further comprises an edge blur analyzing device analyzing an edge blur of the analyzable image.

25. The smoke detecting device according to claim 22, wherein the analyzing device further comprises an action analyzing device analyzing a centroid of the moving object and if the moving object is expanding within a predetermined time period.

26. A smoke detecting method, comprising:
    capturing a plurality of images, the images comprising a background image and an analyzable image having a moving object;
    analyzing an edge blur of the analyzable image, comprising:
        detecting an edge pixel(s) in a plurality of pixels displaying the moving object in the analyzable image; and
        analyzing a strength value variation of each of the edge pixel(s); and
    determining if the moving object is a smoke by comparing analyzed results from the analyzing step with a corresponding predetermined feature.

27. The smoke detecting method according to claim 26, wherein a combination of the analyzing step and the determining step further comprises:
    detecting a first number of the edge pixels;
    calculating a first strength value of each edge pixel in the analyzable image and a second strength value of each corresponding pixel in the background image;
    defining an edge pixel of the first number of edge pixels as an edge blur pixel when a ratio of the first strength value of the edge pixel to the second strength value of the corresponding pixel in the background image is less than a predetermined value;
    defining a second number of edge blur pixels in the first number of edge pixels; and
    determining the analyzed results conform to the corresponding predetermined feature when a ratio of the second number to the first number is within a predetermined range.

28. The smoke detecting method according to claim 26, wherein the analyzing step further comprises analyzing at least one of a chrominance variation and a flickering frequency of the analyzable image.

29. The smoke detecting method according to claim 26, wherein the analyzing step further comprises analyzing a centroid of the moving object and if the moving object is expanding within a predetermined time period.

30. A smoke detecting device, comprising:
    an image capturing device capturing a plurality of images, the images comprising a background image and an analyzable image having a moving object;
    an analyzing device coupled to the image capturing device, detecting an edge pixel(s) in a plurality of pixels displaying the moving object in the analyzable image, and analyzing a strength value variation of each of the edge pixel(s); and
    a determining device coupled to the analyzing device for determining if the moving object is a smoke by comparing analyzed results obtained from the analyzing device with a corresponding predetermined feature.

31. The smoke detecting device according to claim 30, wherein the analyzing device further comprises a flickering frequency analyzing device analyzing a flickering frequency of the analyzable image.

32. The smoke detecting device according to claim 30, wherein the analyzing device further comprises a chrominance analyzing device analyzing a chrominance variation of the analyzable image.

33. The smoke detecting device according to claim 30, wherein the analyzing device further comprises an action analyzing device analyzing a centroid of the moving object and if the moving object is expanding within a predetermined time period.

34. A smoke detecting method, comprising:
    capturing a plurality of images, the images comprising an analyzable image having a moving object;
    analyzing a centroid of the moving object and if the moving object is expanding within a predetermined time period; and
    determining if the moving object is a smoke by comparing analyzed results from the analyzing step with a corresponding predetermined feature.

35. The smoke detecting method according to claim 34, wherein the determining step determines the analyzed results conform to the corresponding predetermined feature when the centroid is moving in one of upward and downward directions within the predetermined time period while the moving object expands within the predetermined time period.

36. The smoke detecting method according to claim 34, wherein the analyzing step further comprises analyzing at least one of an edge blur and a chrominance variation of the analyzable image.

37. The smoke detecting method according to claim 34, wherein the analyzing step further comprises analyzing a flickering frequency of the analyzable image.

38. A smoke detecting device, comprising:
    an image capturing device capturing a plurality of images, the images comprising an analyzable image having a moving object;
    an analyzing device coupled to the image capturing device, analyzing a centroid of the moving object and if the moving object is expanding within a predetermined time period; and
    a determining device coupled to the analyzing device for determining if the moving object is a smoke by comparing analyzed results obtained from the analyzing device with a corresponding predetermined feature.

39. The smoke detecting device according to claim 38, wherein the analyzing device further comprises a flickering frequency analyzing device analyzing a flickering frequency of the analyzable image.

40. The smoke detecting device according to claim 38, wherein the analyzing device further comprises at least one of an edge blur analyzing device analyzing an edge blur of the analyzable image and a chrominance analyzing device analyzing a chrominance variation of the analyzable image.

* * * * *